(12) United States Patent
Soliman et al.

(10) Patent No.: US 11,704,518 B1
(45) Date of Patent: Jul. 18, 2023

(54) PER-IMAGE PRINT SETTING OPTIMIZATION

(71) Applicant: Amazon Technologies, Inc., Seattle, WA (US)

(72) Inventors: Sherif Soliman, Seattle, WA (US); Kevin Tsukahara, Frisco, TX (US); Erin Fern Breslin, Seattle, WA (US); Rhia Bucklin, Seattle, WA (US); Val Fox, Shoreline, WA (US); Ron Christopher Belmarch, Seattle, WA (US); Nick M. Stangel, Frisco, TX (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/746,641

(22) Filed: May 17, 2022

(51) Int. Cl.
*H04N 1/04* (2006.01)
*G06K 15/02* (2006.01)
*G06N 3/08* (2023.01)

(52) U.S. Cl.
CPC ..... *G06K 15/1805* (2013.01); *G06K 15/1806* (2013.01); *G06N 3/08* (2013.01)

(58) Field of Classification Search
CPC .......... G06K 15/1805; G06K 15/1806; G06K 15/1807; G06K 15/1809
See application file for complete search history.

(56) References Cited

U.S. PATENT DOCUMENTS

| | | | |
|---|---|---|---|
| 5,025,282 A * | 6/1991 | Nakamura | G03B 27/735 706/22 |
| 2020/0193249 A1* | 6/2020 | Matsuzawa | G06N 3/08 |
| 2020/0249892 A1* | 8/2020 | Shikagawa | G06F 3/1254 |
| 2020/0311982 A1* | 10/2020 | Ogawa | H04N 19/86 |

* cited by examiner

*Primary Examiner* — Moustapha Diaby
(74) *Attorney, Agent, or Firm* — K&L Gates LLP (57) ABSTRACT

Devices and techniques are generally described for per-image printer setting optimization. In some examples, first data representing first input image data may be generated. A classifier network may generate first category data representing a predicted image category for the first input image data based at least in part on the first data. Second data representing a color of a printing medium and third data associated with a material of the printing medium may be determined. First printer configuration data may be determined by searching a first data structure using a combination of the first category data, the second data, and the third data. The first input image data and the first printer configuration data may be sent to the first printer. The first printer may be effective to print the first input image data using settings specified by the first printer configuration data.

20 Claims, 6 Drawing Sheets

PER-IMAGE PRINT SETTING OPTIMIZATION

BACKGROUND

Printer settings (printer configurations) affect the amount of fixation, the color gamut, the white layer, the ink, the medium, etc., for a given print job. Image clarity, color vibrancy, among other image characteristics may affect how a printed image appears for a given set of printer settings.

DETAILED DESCRIPTION

In the following description, reference is made to the accompanying drawings that illustrate several example embodiments of the present disclosure. It is understood that other examples may be utilized and various operational changes may be made without departing from the scope of the disclosure. The following detailed description is not to be taken in a limiting sense, and the scope of the embodiments of the present invention is defined only by the claims of the issued patent.

Custom print services, such as apparel printing services for articles of clothing and/or accessories, may offer a variety of designs that users may select from for printing. Further, in some cases, users may upload their own image data for printing by the print service. Additionally, the print services may allow the selected images to be printed on a variety of media, with different media having different characteristics (e.g., color, material, absorptivity, reflectivity, etc.). In some examples, print services may use standard print configurations (e.g., static, per-printer configurations) across fleets of printers. Print configurations (including the print settings of a given print configuration) determine the inputs for a given print job. Print settings determine the amount of fixation, color gamut, white layer, ink type/color, etc., to be used for a given print job. Print settings may be optimized and/or tuned such that the print settings produce the best possible quality printed images across all images, thereby maximizing user satisfaction. Use of a static printer configuration simplifies operation as it limits the technical ability needed by operators of print equipment (as opposed to operator-tuned print settings). However, such static settings may produce a muted color pallet, with colors and color intensities that look good on some images, but which may appear dull on other images.

Described herein are methods and techniques that may be used to determine per-image printer configurations that optimize the print settings for the individual images. The various techniques described herein may leverage machine learning to predict a particular category of an input image, based on the characteristics of the image itself. The predicted image category may be combined with other characteristics of the particular print job (e.g., color, print media, brand, fabric type, etc.) to determine the print configuration for printing the image. In some examples, machine learning models may be used to predict the image category based on an encoded representation of the image. In other examples, machine learning models may be used to predict the optimal print settings for the input image.

Selection of print configurations for image data is an existing technical problem. In addition, human selection of different image categories may result in misclassification of certain images thereby associating the misclassified images with print settings that are sub-optimal for the image. The various technical solutions described herein may allow categorization of image data in such a way that optimal print configurations are learned and determined based on the image data itself rather than on a subjective human interpretation of the image category.

Machine learning techniques are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Figure 1:
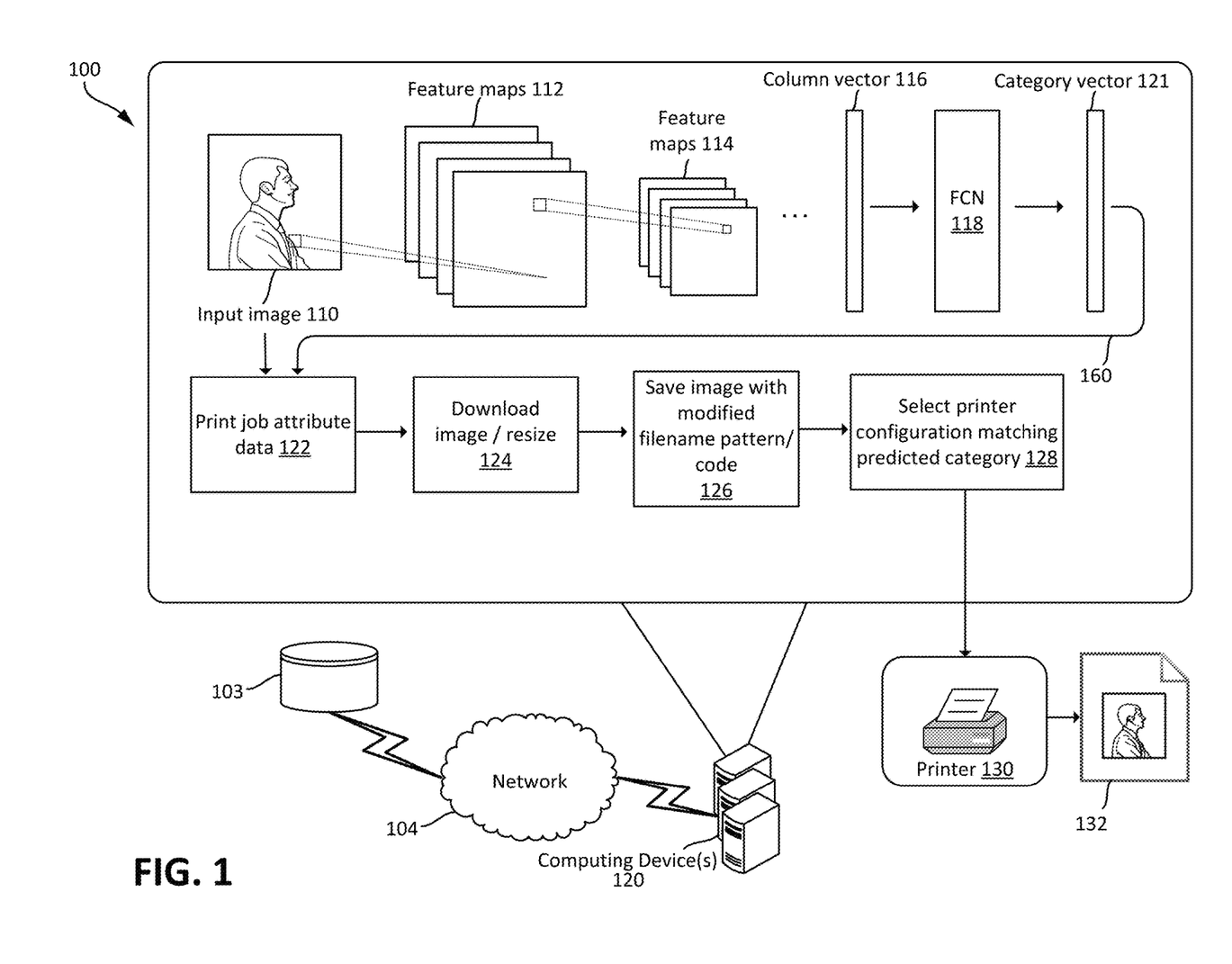
FIG. 1 is a diagram of an example system configured to optimize print settings on a per-image basis, according to various embodiments of the present disclosure.

FIG. 1 is a diagram of an example system 100 configured to optimize print settings on a per-image basis, according to various embodiments of the present disclosure. As depicted in FIG. 1, computing device(s) 120 may include a non-transitory computer-readable memory 103 and/or may be configured in communication with non-transitory computer-readable memory 103, such as over network 104. In various examples, network 104 may represent a local area network (LAN) and/or a wide area network (WAN) such as the internet. Non-transitory computer-readable memory 103 may store computer-executable instructions that may be effective to program at least one processor of a computing device to perform one or more of the various techniques described herein.

Input image 110 may be a frame of image data. The frame of image data may be a two-dimensional grid of pixel values. Additional data may be included with the input image 110 such as histograms representing tonal distribution of the image. As shown in FIG. 1, in some examples, a series of convolution filters may be applied to the image to generate feature maps 112. The convolution operation applies a sliding-window filter kernel of a given size (e.g., 3×3, 5×5, in terms of pixel height and width) over the image and computes a dot product of the filter kernel with the pixel values. The output feature map 112 for a single convolution kernel represents the features detected by the kernel at different spatial locations within the input frame of image data. Zero-padding may be used at the boundaries of the input image data to allow the convolution operation to compute values for the columns and rows at the edge of the image frame.

Down-sampling may be used to reduce the size of the feature maps 112. For example, max-pooling may be used to down-sample feature maps 112 to generate reduced-size feature maps 114 (modified feature maps relative to the feature maps 112). Other pooling techniques may instead be used to down-sample feature maps 112 and generate feature maps 114. Generally, pooling involves a sliding window-filter over the feature maps 112. For example, using a 2×2 max-pooling filter, the largest value from a feature map 112 in a given window (at a given frame location) may be used to represent that portion of the feature map 112 in a feature map 114. Max-pooling uses the features with the highest impact on a given window and reduces processing time at subsequent operations. Although not shown in FIG. 1, an activation function may be applied to the reduced size feature maps 114 following the pooling operation. For example, the Rectified Linear Unit (ReLU) activation function or sigmoid function may be applied to prevent diminishing gradients during training.

FIG. 1 depicts only a single convolution stage and a single pooling stage. However, any number of convolutions and pooling operations may be used in accordance with the desired implementation. Once the convolution and pooling stages are completed, the system 100 may generate a column vector 116 from the resulting feature maps by converting the two-dimensional feature maps (e.g., arrays) into one-dimensional vectors.

The one-dimensional column vector 116 (representing one or all feature maps 114, depending on the implementation) may be input into a classifier network used to predict a category for the input image 110. In some examples, the classifier network may be fully-connected network (e.g., a neural network, multi-layer perceptron, etc.) (FCN) 118. However, any other classifier may be used in accordance with the desired implementation. For example, a random forest classifier, a regression-based classifier, a deep learning-based classifier, etc., may be used. In the example of FIG. 1, the FCN 118 may take the one-dimensional column vector 116 representing the input image 110 as an input and may be trained to predict a category for the input image 110. The FCN 118 may comprise any number of hidden layers depending on the implementation. In some examples, the FCN 118 may be trained together with the convolutional neural network (CNN) in an end-to-end fashion to classify input images as pertaining to one of a number of predefined image categories. In at least some other examples, a pre-trained CNN may be used to generate embeddings (e.g., column vectors 116) that may be used as input to the FCN 118 or other classifier. In such examples, the FCN 118 or other classifier may be trained without re-training the CNN.

A softmax layer may be used as a part of the FCN 118. The softmax layer may include a node for each category of the predefined number of image categories. Accordingly, the category vector 121 may have n dimensions where n is the number of image categories. The value for each dimension may be the score for that image category with all scores in the category vector 121 summing to 1. The element of category vector 121 with the highest score may be selected as the predicted category for the input image 110.

The predicted image category data 160 may be combined with print job attribute data 122. Print job attribute data 122 may be determined by scanning a code (e.g., a QR code) associated with the print job. The QR code may represent specific parameters of the print job. For example, the print job attribute data 122 may include the predicted image category data 160 representing the predicted image category, data representing a color of the print medium (e.g., an encoding representing a particular color of a vinyl material, an encoding representing a t-shirt color, etc.), data representing a brand of the print medium (e.g., a brand of a material on which the printing is to be done), data representing the print medium itself (e.g., a material ID and/or material characteristics, fabric type, etc.), histogram data representing the image, pixel data of the image, data representing a color profile of the input image, etc. In examples, where the print medium is apparel, the print job attribute data 122 may include a size of the apparel.

At block 124, the input image data may be downloaded and the input image may be resized (e.g., according to data of the print job attribute data 122 representing a size). For example, the input image may be resized to fit the size of the print media. At block 126, the input image data (e.g., as resized at block 124) may be saved and a filename of the resized input image data may be modified (or other code data may be generated) to incorporate data representing the print job attribute data 122. For example, the various codes identifying the color of the print medium, brand of the print medium, print medium ID, the predicted category ID, etc., may be integrated into the filename pattern (or other combined code data). At block 128, a printer configuration matching the predicted category may be selected. In various examples, the print job attribute data 122 may be used to select a printer configuration that is associated with the print job attribute data 122. For example, the filename pattern generated at block 126 may be used as a search query to search a data structure that associates the various print job attribute data 122 with a printer configuration. As such, the query to the data structure may represent color data (of the print medium), brand data (of the print medium), material data (describing the material of the print medium), the predicted category data, etc. The particular data associated with the printer configuration may depend on the desired implementation. In various examples, the printer configuration (including individual printer settings) may be empirically determined using the aforementioned print job attribute data).

However, in some other examples, the various machine learning models described above may be configured to directly predict the printer configuration. For example, in addition to determining feature data representing the input image 110, the print job attribute data 122 may be input into a classifier model (e.g., together with the feature representation of the input image 110 (e.g., column vector 116)) and the classifier model may be trained to predict the printer configuration.

In either case, the printer configuration and the data representing the input image 110 may be sent to a printer 130 which may be configured to print the input image 110 on the print media (e.g., represented by print job attribute data 122) to generate the printed image 132.

In various examples, a determination may be made (e.g., based on the printed image 132) that the predicted category is incorrect and/or that the printer configuration settings are not optimal for a given printed image 132). In such examples, a feedback mechanism may be used. The feedback mechanism may include annotating the printed image 132 with the correct image category and using the annotated printed image 132 as training data when re-training the FCN 118 (or other classifier) and/or the CNN. In some other examples, a new image category corresponding to the input image 110 may be determined based on the printed image 132. Accordingly, the FCN 118 may be modified to accommodate the new image category. In some examples described in further detail below, a classifier may directly predict the printer configurations for a given input image 110. Accordingly, the printer configuration settings may be tailored to each individual input image 110.

Figure 2:
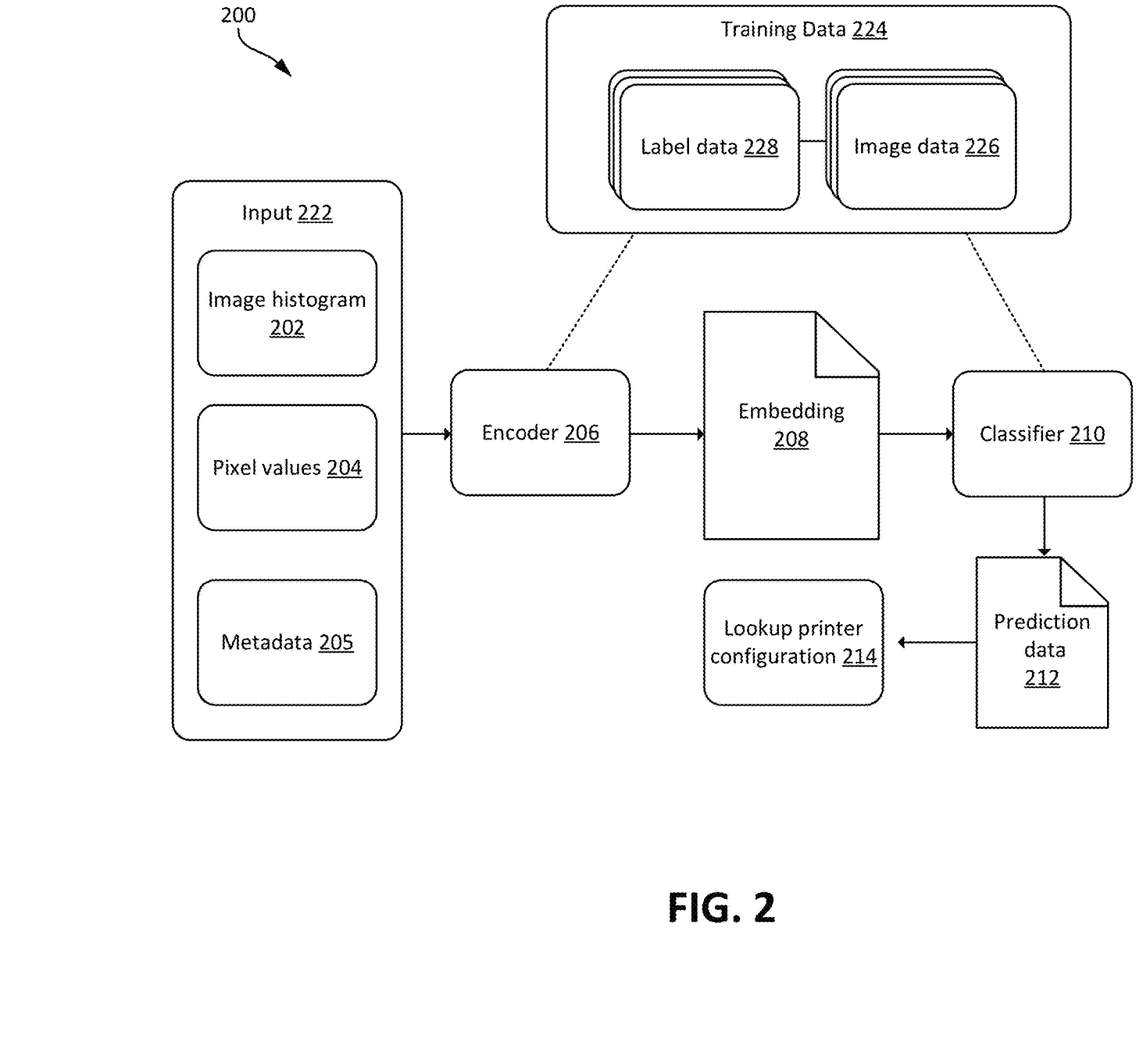
FIG. 2 depicts another example system configured to optimize print settings on a per-image basis, in accordance with various aspects of the present disclosure.

FIG. 2 depicts another example system 200 configured to optimize print settings on a per-image basis, in accordance with various aspects of the present disclosure. In the example of FIG. 2, the input 222 may comprise various data representing and/or describing attributes of the input image 110. For example, an image histogram 202 may be data representing a distribution of different tones by plotting the number of pixels for each tonal value in the image. Pixel values 204 may be the raw (or compressed) pixel values pertaining to each pixel of the input image 110. In addition, various metadata 205 may be included describing various aspects of the image, such as camera settings, location data, sensor data, etc. The input 222 may be sent to an encoder 206 (e.g., an encoder network). The encoder 206 may include rules and/or may be trained using machine learning techniques to generate embedding data 208 that represents the input 222. The encoder 206 may encode input 222 using categorical embeddings and/or numerical embeddings. Encoder 206, the CNN described in reference to FIG. 1, FCN 118, and/or classifier 210 may be trained using training data 224. Training data 224 may include pairs of label data 228 and image data 226 (with each pair making up a training data sample). For each image of image data 226, the label data 228 may label the category of that image (and may thus be described as a category label).

Embedding 208 representing the encoded input 222 may be input into classifier 210. Classifier 210 may be a neural network or other machine learning model trained to generate prediction data 212 for a given input. The prediction data 212 may be the printer configuration for a given image or it may be a predicted image category, depending on the particular implementation. In various examples where the prediction data 212 is a predicted image category, the image category together with various aspects of the print job (e.g., print job attribute data 122) may be used to lookup a printer configuration 214 from a data structure.

Various examples of image categories that may have distinct printer configurations are now described. One image category may include images with white ink only with no other colors present. Another image category may be photo landscape images that display a landscape and/or a real world scene without people present. Another image category may be a photo with people (e.g., a real world scene that includes people). Another image category may be a photo classified as "vibrant." Vibrant photos may be images with high RGB saturation values and/or chroma (e.g., as determining using an image histogram and various thresholds). Another image category may include logos (e.g., logos of sports teams, brands, etc.) that require exact color matching as described by the entity owning the logo. The aforementioned categories are merely examples of categories. The particular categories may be defined by those implementing the system. Additionally, new categories may be defined and used at any time. In various examples, the machine learning models themselves may learn the categories directly from the training data, with the number of learned categories being defined by the number of output classifier nodes.

Figure 3:
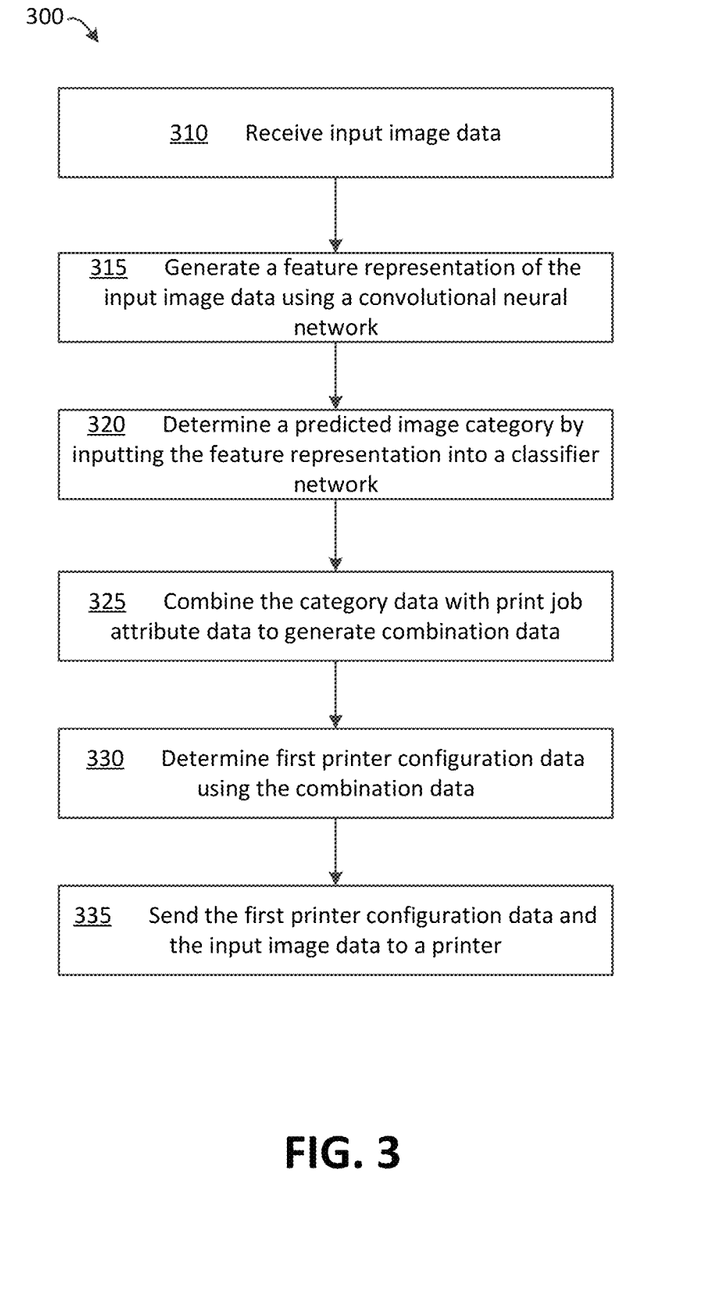
FIG. 3 is a flow chart depicting an example process for determining print settings for an input image, in accordance with various aspects of the present disclosure.

FIG. 3 is a flow chart depicting an example process 300 for determining print settings for an input image, in accordance with various aspects of the present disclosure. Those portions of FIG. 3 that have been previously discussed in reference to FIGS. 1-2 may not be described again for purposes of clarity and brevity. The actions of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 300 may begin at action 310, at which input image data may be received. The input image data may be uploaded by a user and/or may be identified by a uniform resource locator identifying a location from which the input image data may be downloaded. Processing may continue at action 315, at which a feature representation of the input image data may be generated using a convolutional neural network. As previously described, feature maps may be generated using convolution operations performed on the pixel values of the input image data. Pooling operations may be used to down-sample the feature maps and an activation function may be applied to the feature values. Any number of convolution and/or pooling operations may be applied depending on the desired implementation. In various examples, the feature maps may be flattened to generate a one dimensional vector for ease of processing.

Processing may continue at action 320, at which a predicted image category may be determined by putting the feature representation into a computer-implemented classifier network. The classifier network may be a neural network and may include a softmax layer as an output layer. The output layer may output an output vector with each element representing a respective probability of the category associated with that element/neuron. The neuron with the highest score in the output layer (e.g., output vector) may correspond to the predicted image category. Accordingly, the computer-implemented classifier network may generate a category prediction (or a print settings prediction, depending on the implementation). Processing may continue at action 325, at which the category data (e.g., representing the predicted image category) may be combined with print job attribute data to generate combination data. For example, a filename pattern may be modified to include various print job attribute data as well as the predicted image category. The print job attribute data may be determined by receiving data associated with the print job (e.g., color data, data identifying the print medium, etc.). The print job attribute data may be received from a web service based on selections made by a user (the user for whom the print job is performed) and/or may be received by, for example, scanning a bar code or QR code on a piece of apparel on which the print job is to be printed.

Processing may continue at action 330, at which first printer configuration data may be determined using the combination data. For example, the filename pattern may be used to query a data structure. The first printer configuration data may be associated with the various data included in the filename pattern in the data structure. For example, the first printer configuration data (e.g., printer settings) may be associated with not only the predicted category of image data, but also with the print medium, the color of the print medium, the material of the print medium, etc. Processing may continue at action 335, at which the first printer configuration data and the input image data may be sent to a printer. The printer may be effective to print the print job using the selected printer settings (e.g., the printer settings specified by the first printer configuration data).

Figure 4:
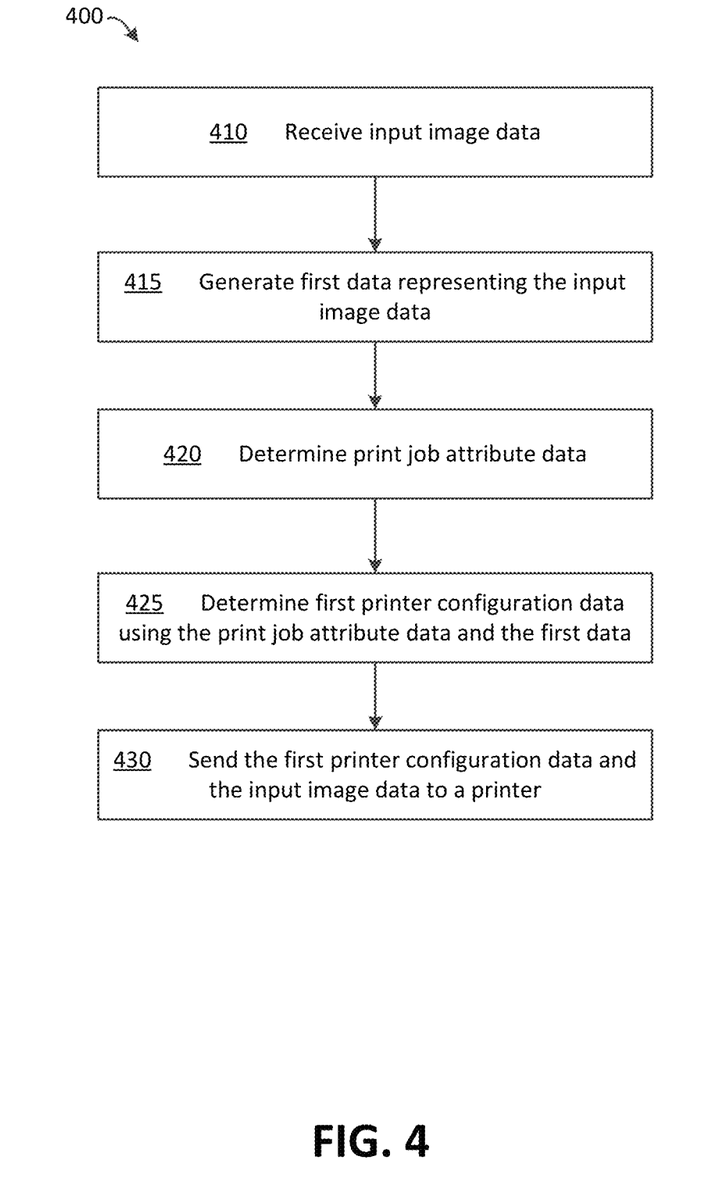
FIG. 4 is a flow chart depicting another example process for determining print settings, in accordance with various aspects of the present disclosure.

FIG. 4 is a flow chart depicting another example process 400 for determining print settings, in accordance with various aspects of the present disclosure. Those portions of FIG. 4 that have been previously discussed in reference to FIGS. 1-3 may not be described again for purposes of clarity and brevity. The actions of the process 400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 400 may begin at action 410, at which input image data may be received. The input image data may be uploaded by a user and/or may be identified by a uniform resource locator identifying a location from which the input image data may be downloaded. Processing may continue at action 415, at which first data representing the first input image data may be generated. In some examples, the first data may be generated using a convolutional neural network. However, in other examples, the first data may be encoded using various data representing the image (e.g., the image histogram, pixel values, metadata, etc.).

Processing may continue at action 420, at which first print job attribute data may be determined. The print job attribute data may be determined by receiving data associated with the print job (e.g., color data, data identifying the print medium, etc.). The print job attribute data may be received from a web service based on selections made by a user (the user for whom the print job is performed) and/or may be received by, for example, scanning a bar code or QR code on a piece of apparel on which the print job is to be printed.

Processing may continue at action 425, at which first printer configuration data may be determined. In various examples, the first data and the print job attribute data may be input into a classifier model that is trained to predict the printer configuration from the first data and the print job attribute data. The machine learning classifier may be trained in a supervised fashion using labeled training data (e.g., images paired with printer configuration labels and/or encodings paired with printer configuration labels). Any desired loss function (e.g., categorical cross-entropy loss) may be used, in accordance with the desired implementation. In at least some other examples, the first printer configuration data may be determined by performing a lookup using the first data and/or the print job attribute data as a query to determine the printer configuration that is associated with the print job attribute data and/or the first data representing the input image data.

Processing may continue at action 430, at which the first printer configuration data and the input image data may be sent to a printer. The printer may be effective to print the print job using the first printer configuration data to configure the printer settings.

Figure 5:
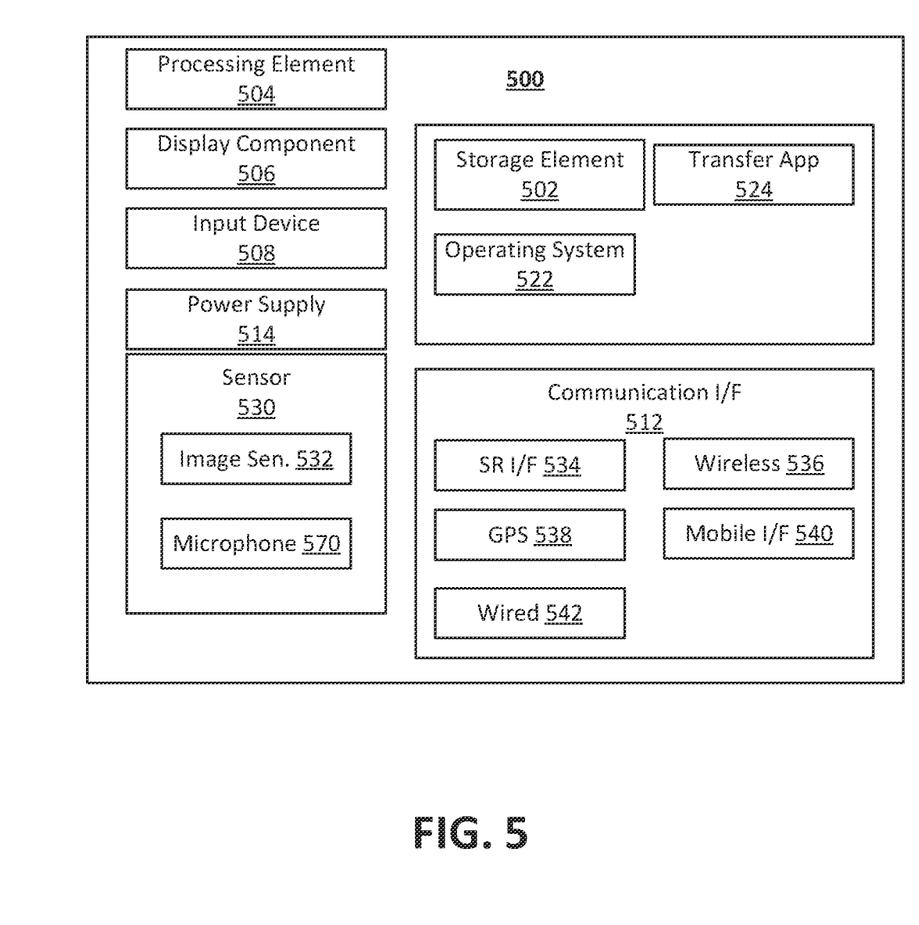
FIG. 5 is a block diagrams showing an example architecture of a computing device that may be used in accordance with various embodiments described herein.

FIG. 5 is a block diagram showing an example architecture 500 of a computing device that may be used to determine printer settings, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more position sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing device(s) 120, as described herein, are exemplary, and may be located as a stand-alone device or may be included, in whole or in part, as a component of a larger device or system.

Figure 6:
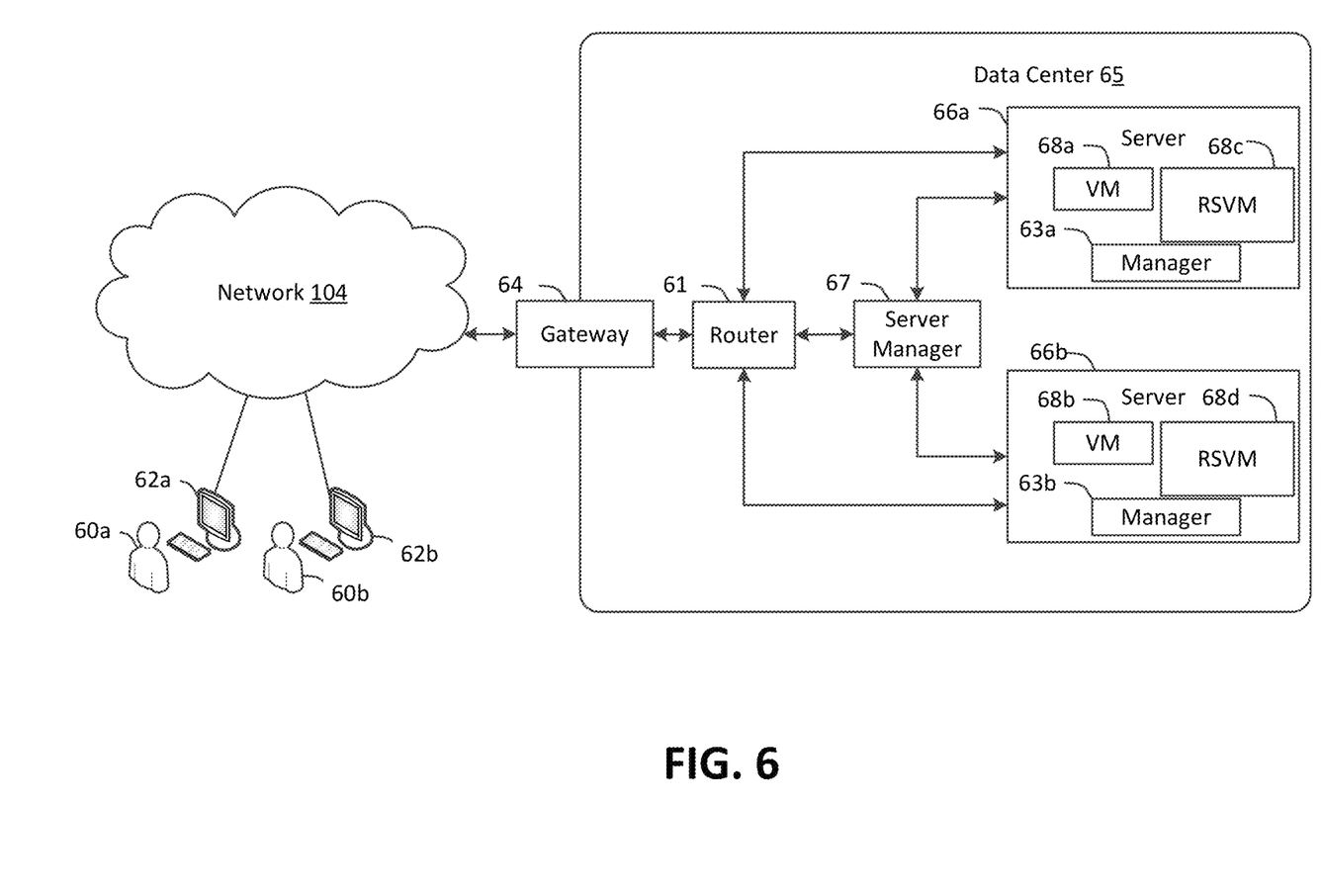
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to determine image category and/or printer configuration settings as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various machine learning techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66*a* and 66*b* (which may be referred herein singularly as server 66 or in the plural as servers 66) that provide computing resources. These resources may be available as bare metal resources or as virtual machine instances 68*a-d* (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++ and the like or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method, comprising:
receiving first input image data;
generating, using a convolutional neural network, a feature representation of the first input image data;
inputting the feature representation into a classifier network;
generating, by the classifier network using the feature representation, first category data representing a predicted image category for the first input image data;
determining, using a first code associated with first print media, first data representing a color of the first print media and second data representing a fabric type of the first print media;
searching a first data structure using a combination of the first category data, the first data, and the second data as a search query;
determining first printer configuration data stored in the first data structure, wherein the first printer configuration data is associated with the first category data, the color of the first print media, and the fabric type of the first print media by the first data structure, wherein the first printer configuration data comprises a plurality of printer settings for a first printer;
sending the first input image data to a first printer; and
sending the first printer configuration data to the first printer, wherein the first printer is effective to print the first input image data using the first printer configuration data.

2. The method of claim 1, further comprising:
determining, using the first code associated with the first print media, a size of the first print media;
generating second input image data by resizing the first input image data using the size; and
sending the second input image data to the first printer, wherein the first printer is effective to print the second input image data using the first printer configuration data.

3. The method of claim 1, further comprising:
generating, by the convolutional neural network, a feature map representing the first input image data;
down-sampling the feature map to generate a modified feature map of reduced size; and
generating a column vector comprising values of the modified feature map, wherein the feature representation comprises the column vector, wherein the classifier network is trained using at least a first training data sample comprising a first category label paired with a first feature representation of an image.

4. A method comprising:
receiving first input image data;
generating first data representing the first input image data;
generating, by a computer-implemented classifier network based at least in part on the first data, first category data representing a predicted image category for the first input image data;
determining second data associated with a material of the printing medium;
determining first printer configuration data by searching a first data structure using a combination of the first category data and the second data, wherein the first printer configuration data is associated with the first category data and the second data in the first data structure;
sending the first input image data to a first printer; and
sending the first printer configuration data to the first printer, wherein the first printer is effective to print the first input image data using settings specified by the first printer configuration data.

5. The method of claim 4, further comprising:
generating, by a convolutional neural network, a first feature map using the first input image data;
generating a first one-dimensional vector based at least in part on the first feature map, wherein the first data comprises the first one-dimensional vector;

inputting the first one-dimensional vector into the computer-implemented classifier network; and generating, by an output layer of the computer-implemented classifier network, an output vector representing respective probabilities associated with different image categories.

6. The method of claim 4, further comprising:

generating first training data comprising second input image data and a first label specifying second category data associated with the second input image data;

inputting the second input image data into a convolutional neural network;

determining a first category prediction using the convolutional neural network and the second input image data;

determining a loss based at least in part on a difference between the first category prediction and the second category data; and updating at least one parameter of the convolutional neural network based at least in part on the loss.

7. The method of claim 4, further comprising:

determining first histogram data representing the first input image data; and generating, using an encoder network, the first data, wherein the first data represents an encoded representation of the first histogram data.

8. The method of claim 7, wherein the encoder network and the computer-implemented classifier network are trained end-to-end using supervised training data comprising pairs of image data and category labels.

9. The method of claim 4, further comprising:

determining fourth data representing a size of the printing medium;

generating second input image data by resizing the first input image data based at least in part on the size; and sending the second input image data to the first printer, wherein the first printer is effective to print the second input image data using the first printer configuration data.

10. The method of claim 4, further comprising determining the first printer from among a plurality of printers based at least in part on the first printer configuration data and the second data.

11. The method of claim 4, further comprising:

receiving first input image data;

generating first data representing the first input image data; and generating, by a second computer-implemented classifier network based at least in part on the first data, the first printer configuration data.

12. A system, comprising:

at least one processor; and non-transitory computer-readable memory storing instructions that, when executed by the at least one processor, are effective to:

receive first input image data;

generate first data representing the first input image data;

generate, by a computer-implemented classifier network based at least in part on the first data, first category data representing a predicted image category for the first input image data;

determine second data associated with a material of the printing medium;

determine first printer configuration data by searching a first data structure using a combination of the first category data and the second data, wherein the first printer configuration data is associated with the first category data and the second data in the first data structure;

send the first input image data to a first printer; and send the first printer configuration data to the first printer, wherein the first printer is effective to print the first input image data using settings specified by the first printer configuration data.

13. The system of claim 12, the non-transitory computer-readable memory storing further instructions that, when executed by the at least one processor, are further effective to:

generate, by a convolutional neural network, a first feature map using the first input image data;

generate a first one-dimensional vector based at least in part on the first feature map, wherein the first data comprises the first one-dimensional vector;

input the first one-dimensional vector into the computer-implemented classifier network; and generate, by an output layer of the computer-implemented classifier network, an output vector representing respective probabilities associated with different image categories.

14. The system of claim 12, the non-transitory computer-readable memory storing further instructions that, when executed by the at least one processor, are further effective to:

generate first training data comprising second input image data and a first label specifying second category data associated with the second input image data;

input the second input image data into a convolutional neural network;

determine a first category prediction using the convolutional neural network and the second input image data;

determine a loss based at least in part on a difference between the first category prediction and the second category data; and update at least one parameter of the convolutional neural network based at least in part on the loss.

15. The system of claim 12, the non-transitory computer-readable memory storing further instructions that, when executed by the at least one processor, are further effective to:

determine first histogram data representing the first input image data; and generate, using an encoder network, the first data, wherein the first data represents an encoded representation of the first histogram data.

16. The system of claim 15, wherein the encoder network and the computer-implemented classifier network are trained end-to-end using supervised training data comprising pairs of image data and category labels.

17. The system of claim 12, the non-transitory computer-readable memory storing further instructions that, when executed by the at least one processor, are further effective to:

determine fourth data representing a size of the printing medium;

generate second input image data by resizing the first input image data based at least in part on the size; and send the second input image data to the first printer, wherein the first printer is effective to print the second input image data using the first printer configuration data.

18. A method comprising:

receiving first input image data;

generating first data representing the first input image data;

generating, by a computer-implemented classifier network based at least in part on the first data, first printer configuration data representing predicted printer settings for the first input image data and for a first printer;

sending the first input image data to a first printer; and sending the first printer configuration data to the first printer, wherein the first printer is effective to print the first input image data using settings specified by the first printer configuration data.

19. The method of claim 18, further comprising:

generating, by a convolutional neural network, a first feature map using the first input image data;

generating a first one-dimensional vector based at least in part on the first feature map, wherein the first data comprises the first one-dimensional vector;

inputting the first one-dimensional vector into the computer-implemented classifier network; and generating, by an output layer of the computer-implemented classifier network, data identifying the predicted printer settings.

20. The method of claim 18, further comprising:

determining second data representing a color of a printing medium; and determining third data associated with a material of the printing medium, wherein the computer-implemented classifier network generates the first printer configuration data representing the predicted printer settings based at least in part on a combination of the first data, the second data, and the third data.

* * * * *